United States Patent [19]

Sugiura et al.

[11] 3,959,700

[45] May 25, 1976

[54] SPEED CONTROL DEVICE FOR TRANSISTOR MOTOR

[75] Inventors: Naokatsu Sugiura, Hachioji; Kenichi Suzuki, Isehara, both of Japan

[73] Assignee: Sansui Electric Co., Ltd., Tokyo, Japan

[22] Filed: Oct. 21, 1974

[21] Appl. No.: 516,732

[30] Foreign Application Priority Data

Oct. 23, 1973 Japan.................... 48-123010[U]

[52] U.S. Cl.............................. 318/138; 318/254
[51] Int. Cl.² ........................................ H02K 29/00
[58] Field of Search ............ 318/138, 254, 439, 696

[56] References Cited
UNITED STATES PATENTS

| | | | |
|---|---|---|---|
| 3,667,019 | 5/1972 | Elliott et al. | 318/254 |
| 3,688,172 | 8/1972 | Sieber | 318/254 |
| 3,806,785 | 4/1974 | DeValroger et al. | 318/254 |
| 3,864,610 | 2/1975 | Kawamoto | 318/317 |
| 3,903,463 | 9/1975 | Kanamori | 318/138 |

Primary Examiner—Robert K. Schaefer
Assistant Examiner—John W. Redman
Attorney, Agent, or Firm—Harris, Kern, Wallen & Tinsley

[57] ABSTRACT

A speed control device for a transistor motor having a stator provided with a plurality of field windings and a rotor consisting of a permanent magnet comprises position detecting means for detecting the position of the rotor, a plurality of driving transistors whose emitter-collector circuits are respectively connected in series to the field windings and whose bases are respectively supplied with the output from the position detecting means, a base current control transistor for the driving transistors whose emitter-collector circuit is connected through diodes to the respective bases of the driving transistors, and a servo circuit for maintaining the base current control transistor to be inoperative during the starting period of the transistor motor and, as the transistor motor approaches a specified rotation speed, controlling the base current of the driving transistors in accordance with a speed control signal.

2 Claims, 2 Drawing Figures

SPEED CONTROL DEVICE FOR TRANSISTOR MOTOR

BACKGROUND OF THE INVENTION

This invention relates to a speed control device for a transistor motor, and more particularly to a speed control device for a transistor motor capable of being manufactured inexpensively.

For the purpose of controlling the rotation speed of a transistor motor having a stator whose magnetic pole members are wound with field windings and a rotor consisting of a permanent magnet, there has been proposed a speed control device comprising position detectors provided in corresponding relation to the respective magnetic pole members, a plurality of driving transistors respectively connected in series to the field windings and opened and closed by the signals from the position detectors to changeover in turn the current of the field windings, a field current control transistor for controlling in accordance with the speed control signal the amount of current flowing from a DC power source into the respective field windings, and a servo circuit for controlling the field current control transistor in accordance with the outputs from the position detectors. Generally, in the transistor motor, it is demanded that it can be manufactured in low cost and requires as small a control power as possible to facilitate its miniaturization. In the foregoing prior art speed control device, however, the field current control transistor is required to make control of the total amount of field current. Accordingly, the field current control transistor is required to have a capacity for large current and accordingly the servo amplifier of a servo circuit for supplying control power to this field current control transistor is also required to have a capacity for large current. For these reasons, the prior art speed control device for a transistor motor is unsatisfactory in respect of the cost reduction and miniaturization of the transistor motor.

Accordingly, the object of the invention is to provide a speed control device for a transistor motor capable of dispensing with the above mentioned prior art field current control transistor and therefore attaining the cost reduction and miniaturization of the transistor motor.

SUMMARY OF THE INVENTION

The present device is a speed control device for a transistor motor having a stator provided with a plurality of field windings and a rotor consisting of a permanent magnet, and comprises position detectors provided in corresponding relation to the field windings, respectively, of the stator to detect the position of the rotor, a switching circuit including a plurality of driving transistors whose emitter-collector circuits are connected in series to the field windings, respectively, and whose bases are supplied with the outputs, respectively, from the position detectors, for changing-over in turn the currents of the field windings in accordance with the output signals from the position detectors, a base current control transistor for the driving transistors whose emitter-collector circuit is commonly connected through diodes to the respective bases of the driving transistors, and a servo circuit which is supplied with a speed control signal and supplies its output to the base current control transistor, for maintaining the base current control transistor to be inoperative during the starting period of the transistor motor and, as the transistor motor approaches a specified rotation speed, controlling the base currents applied to the bases of the driving transistors from the position detectors.

According to the invention, it is possible to omit a field current control transistor of large current capacity required to control the total amount of field current and to use the respective driving transistors concurrently as field current control transistors. That is, where it is desired to cause said driving transistors to concurrently act as the field current control transistors, control has only to be made of the base currents of the driving transistors. Such base current control can sufficiently be performed by a base current control transistor of small current capacity. This base current control transistor is further controlled by the output from the servo amplifier position detector having a high frequency coil wound about a magnetically saturable magnetic core, as well as be a position detecting winding coaxially wound about a field winding or so wound as to form a bifilar winding together with a field winding.

DESCRIPTION OF THE PREFERRED EMBODIMENT

Figure 1:
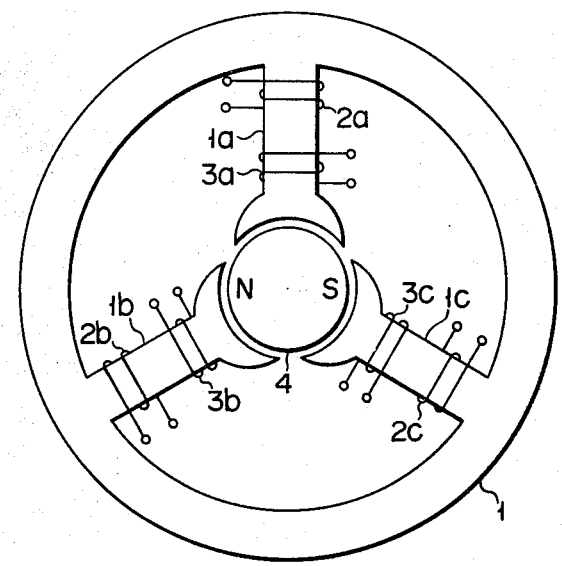
FIG. 1 shows a constructive example of a transistor motor to which the present device is applied.
Figure 2:
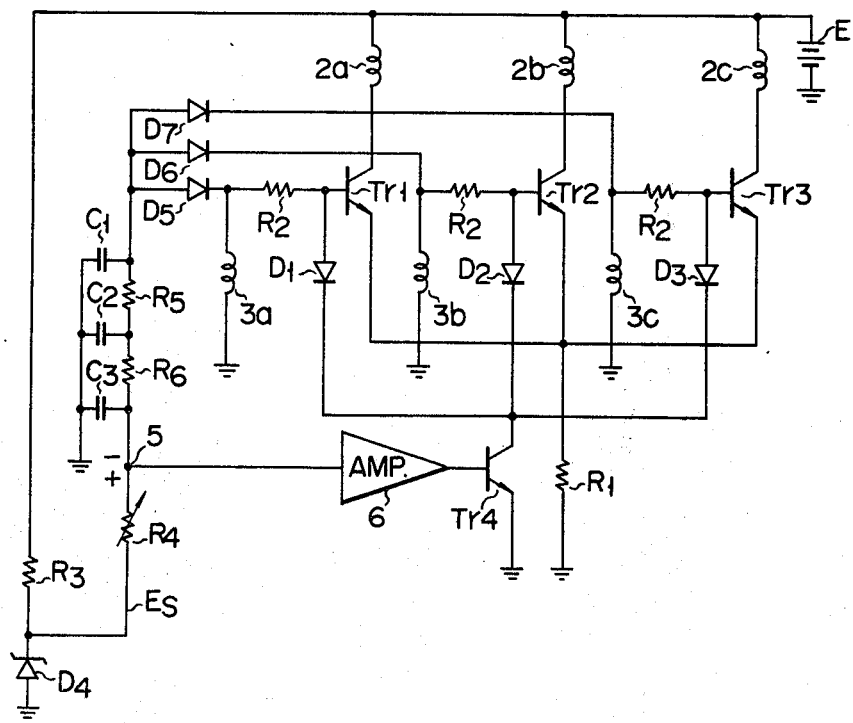
FIG. 2 is a circuit diagram showing an embodiment of the present device for the transistor motor shown in FIG. 1.

As shown in FIG. 1, a stator 1 has stator magnetic pole members 1a, 1b and 1c disposed equiangularly spaced from one another. About the respective stator magnetic pole members are wound field windings 2a, 2b and 2c and position detecting windings 3a, 3b and 3c which are concurrently used as speed detecting windings. A rotor 4 consists of a permanent magnet having two poles N and S. It is apparent that if field current is supplied to the field windings 2a, 2b and 2c in a prescribed order, the rotor will be driven to cause voltages corresponding to the rotor positions to be induced in the position detecting windings 3a, 3b and 3c, respectively. As shown in FIG. 2, the specified ends at one side of the respective field windings 2a, 2b and 2c are connected to the positive pole of a DC source E whose negative pole is grounded while the other side ends are connected to the collectors of driving transistors $Tr_1$, $Tr_2$ and $Tr_3$, respectively. The emitters of the respective drive transistors are commonly grounded through a resistor $R_1$. The bases of the transistors $Tr_1$, $Tr_2$ and $Tr_3$ are connected through diodes $D_1$, $D_2$ and $D_3$ of the illustrated polarities, respectively, to the collector of a base current control transistor $Tr_4$, the emitter of which is grounded. The bases of the transistors $Tr_1$, $Tr_2$ and $Tr_3$ are connected through respective resistors $R_2$ to the specified ends at one side of the position detecting windings 3a, 3b and 3c, the other side ends of which are grounded, respectively. The positive pole of the source E is connected through a resistor $R_3$ to the negative pole of a constant voltage diode $D_4$ whose positive pole is grounded, and a reference voltage Es of positive polarity obtained from the constant voltage diode is supplied through a variable resistance $R_4$ to a voltage comparison point 5. Said specified ends at one side of the position detecting windings 3a, 3b and 3c are connected to the respective negative poles of diodes $D_5$, $D_6$ and $D_7$, the respective positive poles of which are connected to said voltage comparison point 5 through a smoothing circuit consisting of, for example, resistors $R_5$ and $R_6$ and condensers $C_1$, $C_2$ and $C_3$. The voltage at the voltage comparison point 5 is supplied to a servo amplifier 6, the output of which is supplied to the base of the base current control transistor $Tr_4$. This amplifier 6 is so designed that while the transistor motor is making the starting operation, that is, while the input signal is maintained high in level, the output level is zero or extremely low to permit the emitter-collector circuit of the transistor $Tr_4$ to be kept in an open condition, and as the speed of the transistor motor approaches a specified rotation speed, said output level becomes high to close said emitter-collector circuit.

There will now be described the operation of the above mentioned speed control device. When a small rotation force is applied to the rotor 4 at the time of starting the transistor motor, an electromotive force is generated in the position detecting windings. The mutual action between the magnetic flux produced due to said electromotive force and the magnetic flux of the rotor causes the rotor to be increased in rotation number and simultaneously causes the voltages induced in the position detecting windings (mutually presenting a phase difference of 120°) to be also increased in level. Said voltages induced in the position detecting windings are applied in turn through the respective resistors $R_2$ to the bases of the transistors $Tr_1$, $Tr_2$ and $Tr_3$. Since, on the other hand, the voltage at the voltage comparison point 5 of the servo circuit, during the period in which the transistor motor makes the starting operation, has a level approximate to the level of the reference voltage Es, the output level of the servo amplifier 6 is low, and therefore the base current control transistor $Tr_4$ is not driven by such low level output. Accordingly, the currents from the position detecting windings are supplied intact to the driving transistors $Tr_1$, $Tr_2$ and $Tr_3$, respectively. For this reason, a large amount of driving current flows in turn in the field windings $2a$, $2b$ and $2c$, respectively. That is, a sufficient amount of starting torque is generated in the transistor motor, and simultaneously the rotor amounts to a specified rotation number in a short time. As the transistor motor approaches a specified rotation speed, the voltage at the voltage comparison point 5 is decreased in level to cause the output of the servo amplifier 6 to be increased in level, so that the emitter-collector circuit of the base current transistor $Tr_4$ is closed. Accordingly, the currents from the position detecting windings are shunted into the diodes $D_1$, $D_2$ and $D_3$, respectively. Accordingly, the transistor motor gradually amounts to a specified rotation number. After the transistor motor has reached a specified rotation speed, the base currents of the respective driving transistors are so controlled as to preserve said specified rotation speed, in accordance with the voltage at the voltage comparison point 5, that is, the speed control signal.

Where, in the foregoing embodiment, variations of amplification take place among the driving transistors $Tr_1$, $Tr_2$ and $Tr_3$, or where variations of resistance among the field windings, an undesirable variation often takes place in the field current. If, in such cases, the current flowing in the resistor $R_1$ is fedback to the servo amplifier 6 through a feedback resistor not shown, the currents flowing in the respective field windings will be averaged to enable a smooth rotation force to be obtained.

The preceding embodiment referred to the case where the stator has the magnetic pole members each wound with a field winding, but this invention is applicable also to the case where a so-called air-core field winding is provided in the illustrated position of the stator in which the magnetic pole members are disposed, in replacement thereof.

It is obvious that speed detecting means and position detecting means may be provided independently. Namely, the wingings 3a, 3b and 3c may be used as only speed detecting windings and position detecting means not shown may be provided independently.

What we claim is:

1. A speed control device for a transistor motor having a stator provided with field windings and a rotor consisting of a permanent magnet, comprising
    position detecting windings wound at corresponding positions to said field windings, respectively, to detect the position of said rotor,
    a switching circuit including a plurality of driving transistors whose emitter-collector circuits are connected in series to said field windings, respectively, and whose bases are supplied with the outputs, respectively, from said position detecting windings, for changing-over in turn the currents of said field windings in accordance with the output signals from said position detecting windings,
    a base current control transistor for said driving transistors whose emitter-collector circuit is commonly connected through diodes to the respective bases of said driving transistors, and
    a servo circuit which is supplied with a speed control signal and supplies its output to said base current control transistor, for maintaining said base current control transistor to be inoperative during the starting period of said transistor motor and, as said transistor motor approaches a specified rotation speed, controlling in accordance with said speed control signal the base currents applied to the bases of the driving transistors from said position detecting windings.

2. A speed control device for a transistor motor according to claim 1 wherein said stator has a plurality of stator magnetic pole members wound with said field windings, respectively, with said position detecting windings wound about said respective stator magnetic pole members which are also used as speed detecting windings.

* * * * *